(12) United States Patent
Bayrakdar

(10) Patent No.: US 8,863,710 B2
(45) Date of Patent: Oct. 21, 2014

(54) CONTROL VALVE

(75) Inventor: Ali Bayrakdar, Roethenbach/Pegnitz (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 94 days.

(21) Appl. No.: 13/392,321

(22) PCT Filed: Jul. 29, 2010

(86) PCT No.: PCT/EP2010/061004
§ 371 (c)(1), (2), (4) Date: Feb. 24, 2012

(87) PCT Pub. No.: WO2011/045095
PCT Pub. Date: Apr. 21, 2011

(65) Prior Publication Data
US 2012/0145105 A1    Jun. 14, 2012

(30) Foreign Application Priority Data
Aug. 29, 2009  (DE) .......................... 10 2009 039 384

(51) Int. Cl.
*F01L 1/34* (2006.01)
*F01L 1/344* (2006.01)
*F16K 11/07* (2006.01)

(52) U.S. Cl.
CPC .......... *F01L 1/3442* (2013.01); *F01L 2103/00* (2013.01); *F01L 1/34* (2013.01); *F01L 2001/34426* (2013.01); *F16K 11/0716* (2013.01); *F01L 2001/34433* (2013.01); *F01L 2001/3444* (2013.01)
USPC ...................................................... 123/90.17

(58) Field of Classification Search
USPC ...................... 123/90.15, 90.17, 90.33, 90.34; 137/625.34, 625.37, 625.67, 625.69
See application file for complete search history.

(56) References Cited

U.S. PATENT DOCUMENTS

| | | | |
|---|---|---|---|
| 6,871,621 B2 * | 3/2005 | Palesch et al. | 123/90.17 |
| 7,389,756 B2 * | 6/2008 | Hoppe et al. | 123/90.17 |
| 2005/0051123 A1 | 3/2005 | Haser | |
| 2006/0027199 A1 * | 2/2006 | Yoshijima et al. | 123/90.38 |
| 2007/0095315 A1 | 5/2007 | Hoppe et al. | |

FOREIGN PATENT DOCUMENTS

| | | |
|---|---|---|
| CN | 1575934 A | 2/2005 |
| DE | 102 11 468 A1 | 9/2003 |
| DE | 10330142 B3 | 1/2005 |
| WO | 2009071458 A2 | 6/2009 |
| WO | 2009092610 A1 | 7/2009 |

* cited by examiner

*Primary Examiner* — Thomas Denion
*Assistant Examiner* — Daniel Bernstein
(74) *Attorney, Agent, or Firm* — Davidson, Davidson & Kappel, LLC

(57) ABSTRACT

A control valve which has a substantially cylindrical valve box and a substantially cylindrical control piston. The control valve can be arranged in a cylindrical receptacle and the control piston is arranged so as to be axially displaceable inside the valve box.

9 Claims, 4 Drawing Sheets

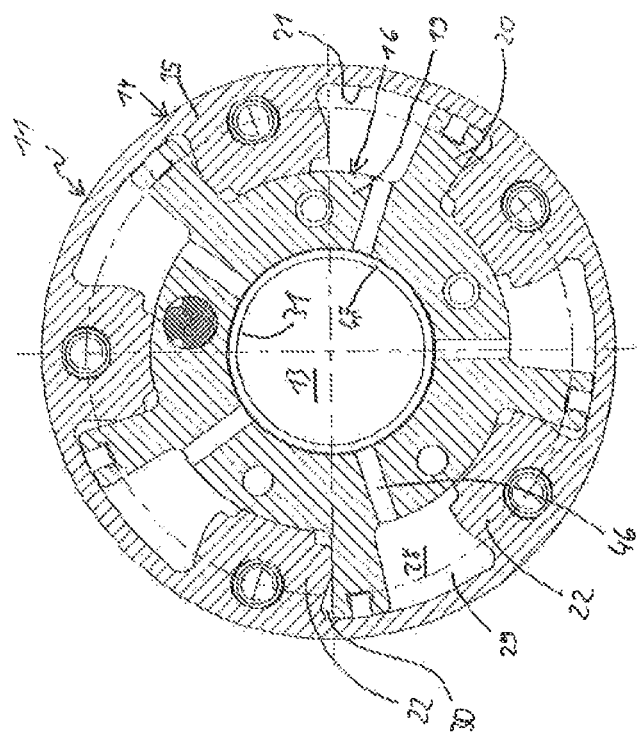
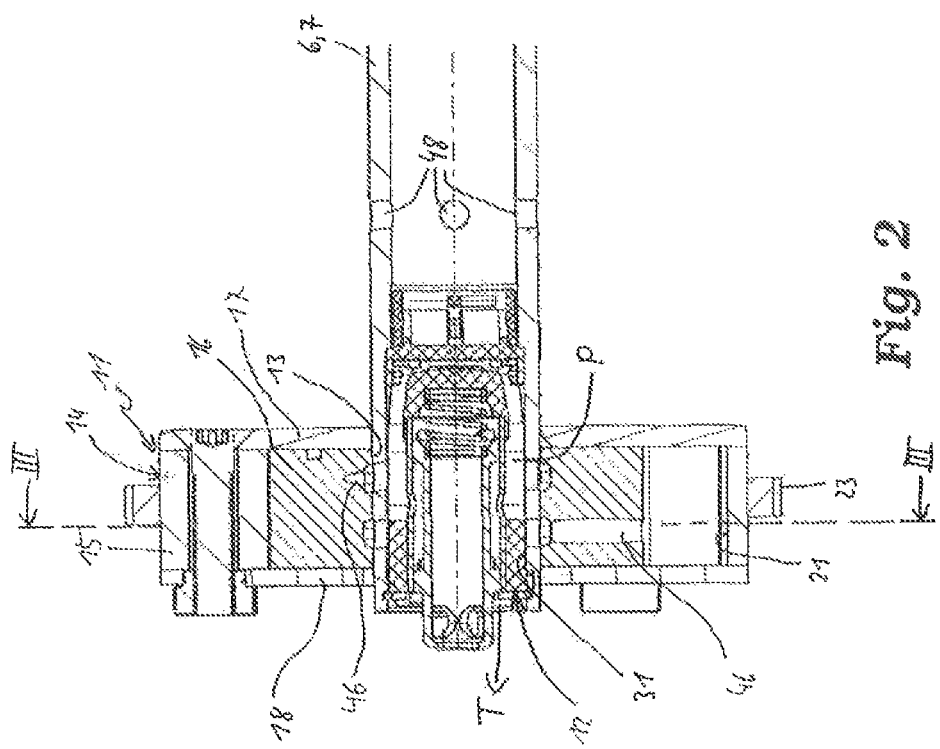
Fig. 3
Fig. 2

US 8,863,710 B2

CONTROL VALVE

CROSS-REFERENCE TO RELATED APPLICATIONS

This application is a 371 of PCT/EP2010/061004 filed Jul. 29, 2010, which in turn claims the priority of DE 10 2009 039 384.6 filed Aug. 29, 2009. The priority of both applications is hereby claimed and both applications are incorporated by reference herein.

FIELD OF THE INVENTION

The invention relates to a control valve with an essentially cylindrically designed valve housing and with an essentially cylindrically designed control piston. The control valve is capable of being arranged inside a cylindrical receptacle, and the control piston is arranged axially displaceably inside the valve housing.

BACKGROUND OF THE INVENTION

Control valves are used in modern internal combustion engines, for example for the control of devices for variably setting the control times of gas exchange valves, by means of which the phase relation between a crankshaft and a camshaft can be configured variably within a defined angular range between a maximum advance position and a maximum retard position. The device is drive-connected to a crankshaft and is connected fixedly in terms of rotation to a camshaft and has a plurality of pressure chambers, by means of which a phase relation between the crankshaft and the camshaft can be varied in a directed way by the supply or discharge of pressure medium. The supply of pressure medium to and discharge of pressure medium from the pressure chambers are controlled by means of a control valve.

A device and a control valve are known, for example, from DE 182 11 468 A1. The device comprises a driven element which is arranged rotatably with respect to a drive element and which is connected fixedly in terms of rotation to a camshaft. The drive element is drive-connected to a crankshaft. Inside the device, a plurality of pressure chambers acting opposite to one another are provided, by means of which the phase position of the driven element in relation to the drive element can be set in a directed way within a defined angular range. Directed rotation of the camshaft in relation to the crankshaft can thus be brought about.

The camshaft is mounted in a cylinder head of the internal combustion engine by means of a plurality of camshaft bearings. Pressure medium is supplied via one of the camshaft bearings to a pressure medium duct formed in the camshaft and can be conducted into the pressure chambers via a control valve which is arranged in a receptacle of the camshaft. The control valve is composed of a valve housing and of a control piston received axially displaceably in the valve housing. The valve housing has a plurality of hydraulic connections, one inflow connection communicating with a pressure medium pump, two working connections communicating with the pressure chambers and one outflow connection communicating with a pressure medium reservoir of the internal combustion engine. The control piston can be positioned in relation to the valve housing in the axial direction, counter to the force of a spring element, by means of an electromagnetic actuating unit, with the result that the working connections are connected to the outflow connection or to the inflow connection and the pressure medium streams are thus controlled from and to the pressure chambers.

SUMMARY OF THE INVENTION

The object on which the present invention is based is to specify a control valve, of which the outlay in terms of assembly is to be reduced.

The object is achieved, according to the invention, in that the valve housing is composed of at least two axial subsections, their ends open in the circumferential direction standing opposite one another in the circumferential direction and bearing one against the other. The control valve according to the invention has no valve housing closed on itself, but instead is constructed from subsections which have ends open in the circumferential direction. During assembly, the subsections are put together, so that their open ends stand opposite one another in the circumferential direction and come to bear one against the other. In this case, the subsections may bear loosely one against the other or the open ends of the subsections may be connected to one another positively or in a materially way. The valve housing may be composed, for example, of a suitable plastic and be produced, for example, by means of an injection molding method.

The valve housing has a plurality of hydraulic connections, in particular at least one inflow connection, one outflow connection and two working connections, the outflow connection being connected to a pressure medium reservoir, the inflow connection being connected to a pressure medium pump and the working connections being connected to the pressure chambers. By means of the control piston, the working connections can be connected selectively to the inflow connection or to the outflow connection.

The subsections can extend, for example, over the entire axial length of the valve housing and be designed, for example, in the form of half shells.

Owing to the multipart form of the valve housing, the assembly of the control valve is considerably simplified. The components, such as, for example, the control piston, a spring element or an intermediate sleeve, which are arranged inside the valve housing in the mounted state, can in this case be introduced into one of the subsections in a simple way. The other subsection or subsections is or are subsequently positioned and, if appropriate, the open ends are connected to one another. In comparison with one-part valve housings, in which all the components have to be introduced into the cavity of the valve housing through an axial orifice, automated assembly is simplified considerably.

In an advantageous development, it is proposed that there be formed, on at least one of the subsections, two axially spaced-apart axial stops for the control piston, one spring receptacle for receiving a spring element which acts on the control piston and/or a nonreturn valve receptacle for a closing body of a nonreturn valve.

Owing to the multipart form of the valve housing, the components can be introduced into one of the subsections and no longer have to be pushed into the cavity of the valve housing through an axial orifice. Thus, additional functionalities, such as, for example, axial stops for the control piston in both directions, can be formed on the valve housing, without the assembly of the control valve being disturbed as a result.

Furthermore, structures which would be possible only at considerable extra outlay in the case of a one-part construction of the valve housing can also be formed in a simple way. For example, cavities can be implemented inside the valve housing between two radially running walls, for example for receiving a spring plate which cooperates as a closing body of a reed-type nonreturn valve with an orifice in the radial wall.

In an advantageous development of the invention, there may be provision whereby a sleeve bears against an inner surface area of the valve housing, the orientation of which sleeve in relation to the valve housing being defined by means of positioning elements formed on at least one of the subsections. A control valve with a valve housing and with a sleeve arranged between the valve housing and the control piston is thus implemented, the orientation of the sleeve in relation to the valve housing being defined. In this case, owing to the multipart form of the valve housing, assembly problems are avoided. The positioning elements can extend radially inward from an inner surface area of the valve housing and, for example, engage in depressions or radial orifices of the sleeve and thus define the orientation of the sleeve in the circumferential direction.

In an actual embodiment of the invention, there may be provision whereby two subsections are connected to one another via a hinge-like connection. The two subsections can, for example, be manufactured simultaneously in one injection molding die. During mounting, these two components are connected pivotally. Mounting is thus simplified even further, since, after the introduction of the control piston, spring element and, if appropriate, further components, the two subsections are already positioned in relation to one another in the axial direction and only have to be swung together.

In a development of the invention, there is provision whereby at least one formfit element, by means of which a securing ring is fastened to the valve housing, is formed on each of the subsections. As a result, on the one hand, the subsections are fixed to one another, and at the same time the securing ring, which can serve for fixing the control valve in a receptacle, is fixed to the valve housing. In this case, there may be provision whereby, on an axial side face of each subsection, at least one hook-shaped formfit element is formed, which is designed to be open radially outward and which engages behind the securing ring in the axial direction, so that the securing ring bears both against the axial side face of the valve housing and against a radially extending section of the hook-shaped formfit element and holds the two subsections in position in relation to one another. Alternatively or additionally, the position of the valve housing in a receptacle may be defined by means of the securing ring.

BRIEF DESCRIPTION OF THE DRAWINGS

Further features of the invention may be gathered from the following description and from the drawings which illustrate exemplary embodiments of the invention in simplified form and in which:

FIG. 2 shows a longitudinal section through a device for variably setting the control times of gas exchange valves of an internal combustion engine by means of a control valve according to the invention, FIG. 3 shows a cross section through the device from FIG. 2 along the line III-III.

DETAILED DESCRIPTION OF THE INVENTION

Figure 1:
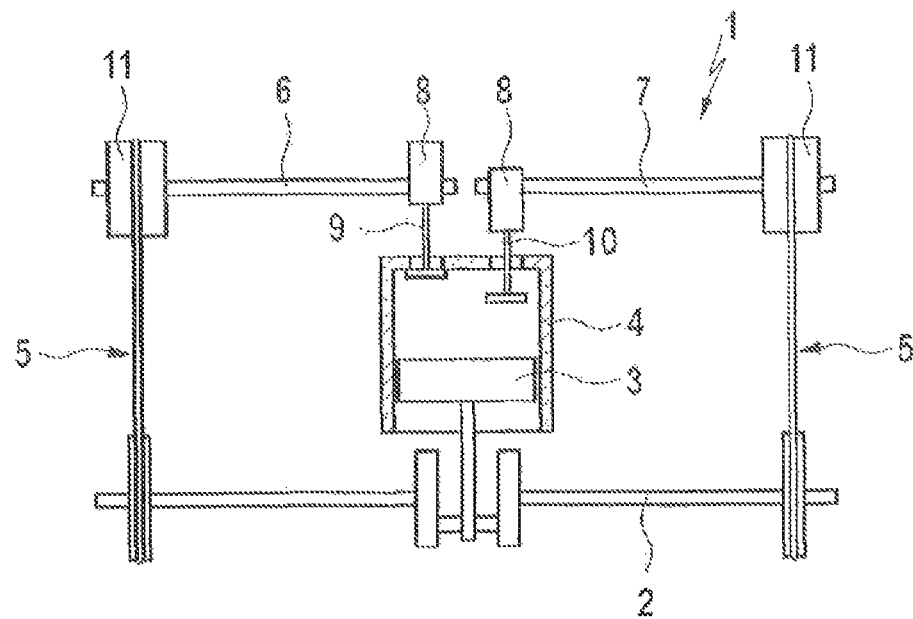
FIG. 1 shows an internal combustion engine only highly diagrammatically.

An internal combustion engine 1 is sketched in FIG. 1. A piston 3 seated on a crankshaft 2 is, indicated in a cylinder 4. In the embodiment illustrated, the crankshaft 2 is connected to an inlet camshaft 6 and an outlet camshaft 7 via a traction mechanism 5. A first and a second device 11 for variably setting the control times of gas exchange valves 9, 10 of an internal combustion engine 1 are capable of ensuring relative rotation between the crankshaft 2 and camshafts 6, 7. Cams 8 of the camshafts 6, 7 actuate one or more inlet gas exchange valves 9 and one or more outlet gas exchange valves 10 respectively. There may also be provision for equipping only one of the camshafts 6, 7 with a device 11 or for providing only one camshaft 6, 7 which is equipped with a device 11.

FIGS. 2 and 3 show a device 11 in longitudinal section and in cross-section respectively, a camshaft 6, 7 and a control valve 12 according to the invention being additionally illustrated in FIG. 2.

The device 11 comprises a drive element 14 and a driven element 16. The drive element 14 is composed of a housing 15 with two side covers 17, 18 which are arranged on the axial side faces of the housing 15 and are fastened to the latter by means of screws. The driven element 16 is designed in the form of an impeller and has an essentially cylindrically designed hub element 19, from the outer cylindrical surface area of which five vanes 20 extend outward in the radial direction in the embodiment illustrated.

Starting from an outer circumferential wall 21 of the housing 15, five projections 22 extend radially inward. In the embodiment illustrated, the projections 22 and the vanes 20 are formed in one part with the circumferential wall 21 and with the hub element 19 respectively. Embodiments will likewise be envisaged in which the vanes 20 and/or the projections 22 are designed as separately manufactured components which are subsequently mounted on the corresponding component. The drive element 14 is mounted on the driven element 16 rotatably in relation to the latter by means of radially inner circumferential walls of the projections 22.

Formed on an outer surface area of the first housing 15 is a chain wheel 23, via which torque can be transmitted from the crankshaft 2 to the drive element 14 by means of a chain mechanism, not illustrated. The driven element 16 has a central orifice 13 which is pierced by the camshaft 6, 7. In this case, the driven element 16 is fastened fixedly in terms of rotation to the camshaft 6, 7 by means of a press fit.

A pressure space 28 is formed inside the device 11 in each case between two projections 22 adjacent in the circumferential direction. Each of the pressure spaces 28 is delimited in the circumferential direction by mutually opposite projections 22 adjacent to essentially radially running boundary walls, in the axial direction by the side covers 17, 18, radially inward by the hub element 19 and radially outward by the circumferential wall 21. A vane 20 projects into each of the pressure spaces 28, the vanes 20 being designed in such a way that they bear both against the side covers 17, 18 and against the circumferential wall 21. Each vane 20 thus divides the respective pressure space 28 into two pressure chambers 29, 30 acting opposite to one another.

By the action of pressure upon one group of pressure chambers 29, 30 and by the relief of pressure from the other group, the face position of the drive element 14 in relation to the driven element 16 and consequently the phase position of the camshaft 6, 7 in relation to the crankshaft 2 can be varied. By the action of pressure upon both groups of pressure chambers 29, 30, the phase position can be kept constant.

Pressure medium is supplied to the device 11 via the interior of the camshaft 6, 7, which is of hollow form, in the embodiment illustrated, and via a control valve 12 arranged in the receptacle 31 of the camshaft 6, 7.

Figure 4:
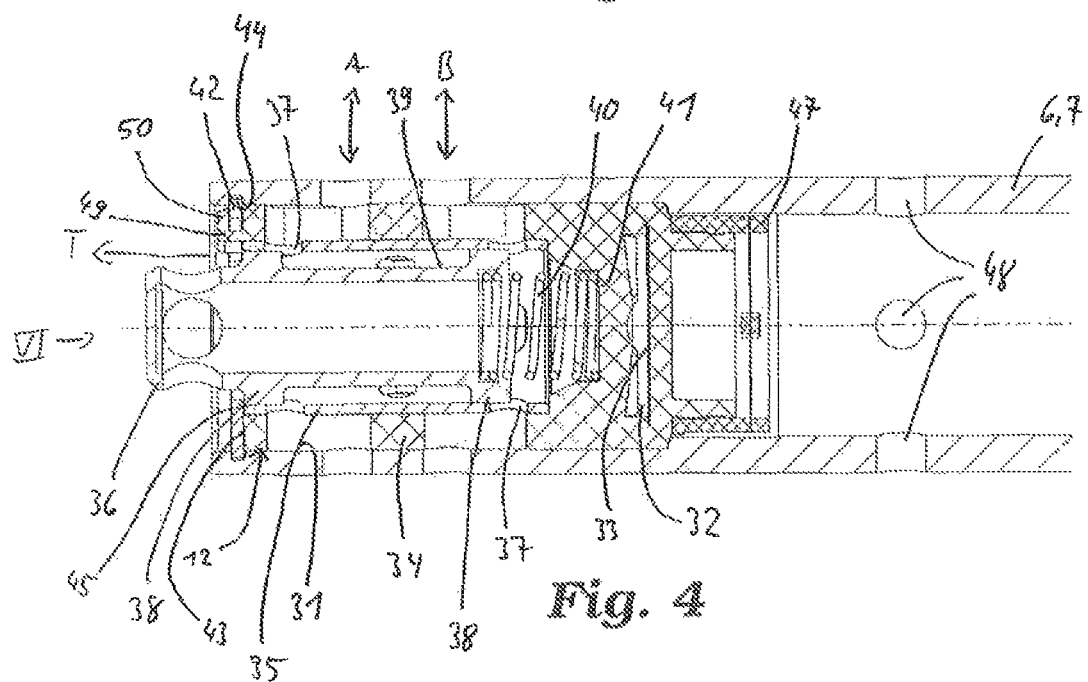
FIG. 4 shows an enlarged view of FIG. 2, only the camshaft and control valve being illustrated and the sectional plane having been tilted through 45° in the circumferential direction.

FIG. 4 shows the control valve 12 inside the camshaft 6, 7 in an enlarged illustration. The control valve 12 has an essentially hollow-cylindrically designed valve housing 34, a cylindrical sleeve 35 and an essentially hollow-cylindrical control piston 36.

Figure 5:
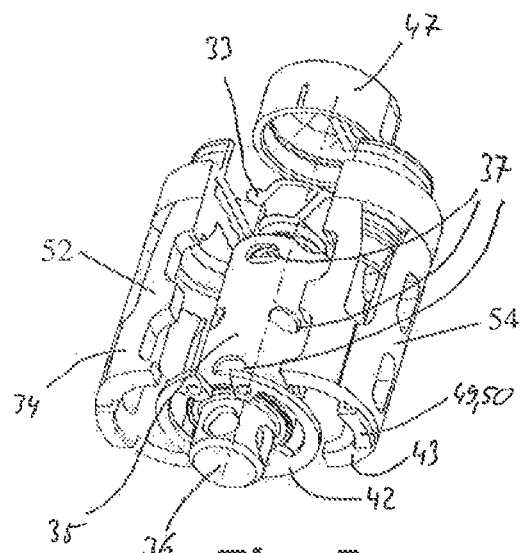
FIG. 5 shows the control valve from FIG. 4 in an exploded illustration.

One radial inflow connection P, two radial working connections A, B and one axial outflow connection T are formed on the valve housing 34. The outflow connection T is designed as an axial orifice on the valve housing 34. The working connections A, B are designed as radial orifices on the surface area of the valve housing 34, each of the working connections A, B communicating with a group of pressure chambers 29, 30 via pressure medium ducts 46 formed in the driven element 16. The inflow connection P is likewise designed as a radial orifice on the surface area of the valve housing 34, said inflow connection being arranged so as to be offset in the circumferential direction to the working connections A, B and being designed as a long hole (FIG. 5). The inflow connection P extends in the axial direction as far as a nonreturn valve receptacle 32 which communicates via an axial orifice, not illustrated, with the interior of the camshaft 6, 7. Arranged in the nonreturn valve receptacle 32 is a spring plate 33 which is prestressed against the axial orifice, not illustrated, so as to implement a nonreturn valve which permits a flow of pressure medium from the camshaft 6, 7 to the inflow connection P and which shuts off an opposite flow of pressure medium. Upstream of the nonreturn valve, a pot-shaped filter element 47 is fastened to the valve housing 34.

The valve housing 34 is arranged inside the camshaft 6, 7, the axial position of which valve housing is defined by a shoulder, formed on the inner surface area of the camshaft 6, 7 and the outer surface area of the valve housing 34, and a securing ring 42. The securing ring 42 projects beyond the valve housing 34 in the radial direction, is arranged in an annular groove 44 formed on the inner surface area of the camshaft. 6, 7 and bears against an axial side face 43 of the valve housing 34.

Figure 8:
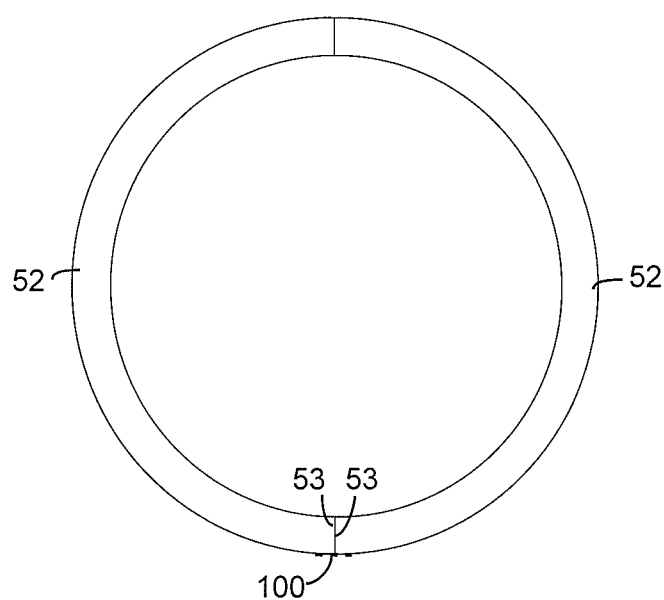
FIG. 8 schematically shows a cross-sectional view of open ends of subsections of the valve housing connected to one another pivotably by means of a schematically shown thin material layer, so as to produce a hinge-like connection.

The valve housing 34 is composed of two axial subsections 52, produced separately from one another, in the form of half shells which extend in each case along the entire axial extent of the valve housing 34. Each of the subsections 52 has two ends 53 open in the circumferential direction, each of the open ends 53 standing opposite an open end 53 of the other subsection 52 in the circumferential direction. In the mounted state of the control valve 12, the open ends 53 of the subsections 52 may bear loosely one against the other or be connected to one another positively or in a materially integral way. It is also conceivable to have, for example, snap connections, zipper connections, adhesive bonds or connections by means of ultrasonic welding. Embodiments may likewise be envisaged in which, as shown schematically in FIG. 8, in each case open ends 53 of the subsections 52 are connected to one another pivotably by means of a schematically shown thin material layer 100, so as to produce a hinge-like connection.

Inside the valve housing 34 is arranged the sleeve 35, the outside diameter of which is adapted to the inside diameter of the valve housing 34. The sleeve. 35 has a plurality of orifices 37, each of the Orifices 37 communicating with one of the working connections A, B or with the inflow connection P.

The control piston 36 is received axially displaceably inside the sleeve 35. The control piston 36 has two control sections 38, the outside diameters of which are adapted to the inside diameter of the sleeve 35. A groove 39 running annularly around the control piston 36 is provided between the control sections 38.

Figure 6:
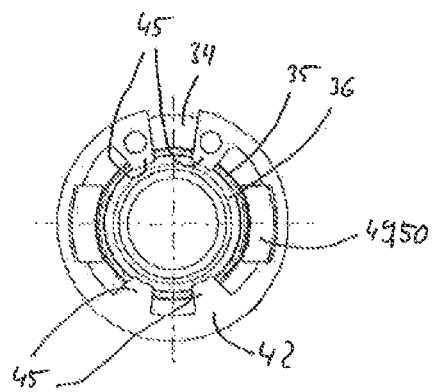
FIG. 6 shows a top view of the control valve according to the arrow VI in FIG. 4.

The control piston 36 can be positioned in relation to the valve housing 34 in the axial direction, counter to the force of a spring element 40, by means of an electromagnetic actuating unit, not illustrated, which acts on that end of the control piston 36 which faces away from the camshaft 6, 7. The spring element 40 is arranged in a spring receptacle 41 formed on the valve housing 34 and is supported, on the one hand, on the spring receptacle 41 and, on the other hand, on the control piston 36. In this case, the travel of the control piston 36 in the axial direction is limited, on the one hand, by the spring receptacle 41, and, on the other hand, by radially inward-extending sections 45 of the securing ring 42 (FIGS. 4-6).

Depending on the position of the control piston 36 in relation to the valve housing 34, one of the working connections A, B is connected to the inflow connection P, while at the same time the other working connection A, B is connected directly or via the interior of the control piston 36 to the outflow connection T. In this case, control edges, by means of which the streams of pressure medium are controlled, are formed on the control sections 38 of the control piston 36 and the orifices 37 of the sleeve 35.

By means of the multipart form of the valve housing 34, the production of the control valve 12 is considerably simplified. In the first place, all the components (control piston 36, sleeve 35, spring element 40, spring plate 33) can be introduced into one of the subsections 52. In a further step, the second subsection 52 is positioned on the first and, if appropriate, the connection between the subsections 52 is made. This makes automated assembly considerably easier, since the components no longer have to be pushed into the interior of the valve housing 34 via an axial orifice, but instead can be introduced into one of the half shells.

When the internal combustion engine 1 is in operation, pressure medium is supplied to the interior of the camshaft 6, 7 via camshaft orifices 48 by a pressure medium pump, not illustrated. The pressure medium passes through the filter element 47, via the axial orifice, not illustrated, in the valve housing 34 and the spring plate 33 to the inflow connection P and, from there, into an annular space which is delimited by the groove 39 formed on the control piston 36 and by the sleeve 35.

Depending on the position of the control piston 36 in relation to the valve housing 34, the pressure medium is conducted to the first or to the second pressure chambers 29, 30. At the same time, pressure medium passes from the other pressure chambers 29, 30 via the outflow connection T to a pressure medium reservoir, not illustrated, of the internal combustion engine 1. A variation in the phase position of the driven element 16 in relation to the drive element 14 and consequently of the camshaft 6, 7 in relation to the crankshaft 2 thereby takes place. When the desired phase position is reached, the electromagnetic actuating unit, not illustrated, displaces the control piston 36 into a neutral position in which pressure medium is supplied to both groups of pressure chambers 29, 30, so that the relative phase position is kept constant.

On the axial side face 43 against which the securing ring 42 bears, a hook-shaped formfit element 49 is formed on each of the subsections 52. The formfit elements 49 are designed to be open radially outward. Each of the formfit elements 49, starting from the side face 43, first extends in the axial direction and has an adjoining radial section 50. The formfit elements 49 engage behind the securing ring 42 in the axial direction, so that the latter is received captively between the axial side face 43 and the radial sections 50. When the control valve 12 is being assembled, first, the sleeve 35, spring element 40 and control piston 36 are introduced into one of the subsections 52. In a subsequent workstep, the second subsection 52 is positioned on the first subsection and, if appropriate, the open ends 53 bearing one against the other are connected to one another. The slotted securing ring 42 is thereafter bent open elastically by means of a circumferentially directed force, and is positioned on the side face 43, the action of force being terminated so that the securing ring 42 resumes its original shape with a smaller diameter and is thus fastened to the valve housing 34. Additional fastening of the two subsections 52 to one another is therefore implemented by means of the securing ring 42. The pot-shaped filter element 47 is subsequently pushed over the other axial end of the valve housing 34, with the result that the connection of the subsections 52 is further reinforced. On account of the radially inward-extending sections 45, both the sleeve 35 and the control piston 36 and consequently the spring element 40 are received captively in the valve housing 34, so that the entire control valve 12 can be delivered as a subassembly to the assembly line, without the fear that components may be lost.

When the control valve 12 is being mounted in the camshaft 6, 7, the control valve 12 is pushed into the latter until the shoulder of the valve housing 34 comes to bear against the shoulder of the camshaft 6, 7. In this case, the securing ring 42, when it enters the camshaft 6, 7, is compressed elastically. In the region of the annular groove 44, the securing ring 42 expands and automatically engages into the latter, so that the axial position of the control valve 12 inside the camshaft 6, 7 is defined. As well as the simple mounting of the control valve 12 in the camshaft 6, 7, one advantage of the control valve 12 according to the invention in the plug-in type of construction is that it can be delivered as a module to the assembly line, without the fear that one of the components, namely the control piston 36, spring element 40, securing ring 42 or sleeve 35, may be lost.

Figure 7:
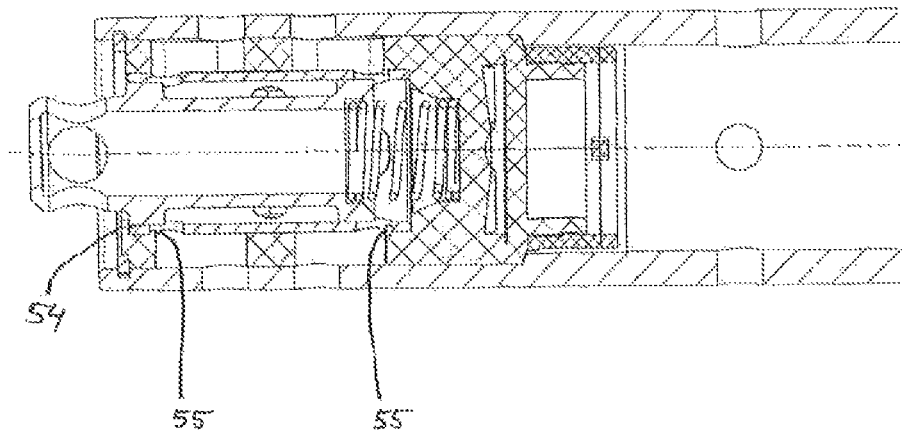
FIG. 7 shows a further embodiment according to the invention of a control valve in an illustration similar to that of FIG. 4.

FIG. 7 shows a further embodiment of a control valve 12 according to the invention similar to the illustration in FIG. 4. In contrast to the first embodiment, an axial stop 54 for the control piston 36 is formed in one part on one of the two subsections 52. This is possible since the control piston 36 and sleeve 35 do not have to be pushed into the valve housing 34 in the axial direction, but instead are introduced into one of the subsections 52.

Furthermore, radially inward-extending positioning elements 55 are formed on the subsections 52 and engage into the orifices 37 of the sleeve 35. This ensures that during the assembly of the control valve 12, the sleeve is oriented correctly in the circumferential direction with respect to the valve housing 34 and the orientation is maintained even during operation.

The valve housings 34 may be manufactured, for example, from steel, aluminum or plastic.

REFERENCE SYMBOLS

1 Internal Combustion Engine
2 Crankshaft
3 Piston
4 Cylinder
5 Traction Mechanism
6 Inlet Camshaft
7 Outlet Camshaft
8 Cam
9 Inlet Gas Exchange Valve
10 Outlet Gas Exchange Valve
11 Device
12 Control Valve
13 Central Orifice
14 Drive Element
15 Housing
16 Driven Element
17 Side Cover
18 Side Cover
19 Hub Element
20 Vane
21 Circumferential Wall
22 Projection
23 Chain Wheel
24
25
26
27
28 Pressure Space
29 First Pressure Chamber
30 Second Pressure Chamber
31 Receptacle
32 Nonreturn Valve Receptacle
33 Spring Plate
34 Valve Housing
35 Sleeve
36 Control Piston
37 Orifice
38 Control Section
39 Groove
40 Spring Element
41 Spring Receptacle
42 Securing Ring
43 Side Face
44 Annular Groove
45 Section
46 Pressure Medium Duct
47 Filter Element
48 Camshaft Orifices
49 Formfit Element
50 Radial Section
51 Through Orifice
52 Subsection
53 Open End
54 Axial Stop
55 Positioning Elements
A First Working Connection
B Second working Connection
P Inflow Connection
T Outflow Connection

The invention claimed is:

1. A control valve capable of being arranged inside a cylindrical receptacle, the control valve comprising:
a substantially cylindrical valve housing comprised of at least two axial subsections having ends that are open in a circumferential direction, stand opposite one another in the circumferential direction and bear one against the other;
a substantially cylindrical control piston arranged axially displaceably inside the valve housing; and
a securing ring, wherein at least one formfit element is formed on each of the at least two axial subsections so as to fasten the securing ring to the valve housing,
wherein each of the at least two axial subsections has an axial side face and on the axial side face at least one hook-shaped formfit element, which has a radially extending section, is formed, the at least one hook-shaped formfit element is open radially outward and engages behind the securing ring in an axial direction so that the securing ring bears both against the axial side face of each of the at least two axial subsections and against the radially extending section of the hook-shaped formfit element and holds the at least two axial subsections in position in relation to one another.

2. The control valve as claimed in claim 1, further comprising two axially spaced-apart axial stops formed on at least one of the at least two axial subsections for the control piston.

3. The control valve as claimed in claim 1, wherein the ends of the at least two axial subsections are connected to one another positively or in a materially integral way.

4. The control valve as claimed in claim 1, wherein at least one of the at least two axial subsections has a spring receptacle for receiving a spring element, which acts on the control piston.

5. The control valve as claimed in claim 1, wherein at least one of the at least two axial subsections has a nonreturn valve receptacle for a closing body of a nonreturn valve.

6. The control valve as claimed in claim 1, further comprising a sleeve bearing against an inner surface area of the valve housing and positioning elements formed on at least one of the at least two subsections, orientation of the sleeve in relation to the valve housing being defined by the positioning elements.

7. The control valve as claimed in claim 1, wherein the at least two axial subsections are produced from plastic.

8. The control valve as claimed in claim 1, wherein the securing ring defines a position of the valve housing in a receptacle of a camshaft.

9. The control valve as claimed in claim 1, wherein the at least two axial subsections are connected to one another pivotably by a thin material layer.

* * * * *